US012355647B2

(12) United States Patent
Cociglio

(10) Patent No.: US 12,355,647 B2
(45) Date of Patent: Jul. 8, 2025

(54) ENABLING A ROUND-TRIP PACKET LOSS MEASUREMENT IN A PACKET-SWITCHED COMMUNICATION NETWORK

(71) Applicant: TELECOM ITALIA S.p.A., Milan (IT)

(72) Inventor: Mauro Cociglio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 579 days.

(21) Appl. No.: 17/622,055

(22) PCT Filed: Jun. 26, 2020

(86) PCT No.: PCT/EP2020/068007
§ 371 (c)(1),
(2) Date: Dec. 22, 2021

(87) PCT Pub. No.: WO2020/260571
PCT Pub. Date: Dec. 30, 2020

(65) Prior Publication Data
US 2022/0263742 A1 Aug. 18, 2022

(30) Foreign Application Priority Data
Jun. 28, 2019 (IT) ........................ 102019000010362

(51) Int. Cl.
*H04L 43/0829* (2022.01)
*H04L 43/0864* (2022.01)

(52) U.S. Cl.
CPC ...... *H04L 43/0841* (2013.01); *H04L 43/0864* (2013.01)

(58) Field of Classification Search
CPC ........................ H04L 43/0841; H04L 43/0864
See application file for complete search history.

(56) References Cited

U.S. PATENT DOCUMENTS 7,796,524 B1 * 9/2010 O'Connell .......... H04L 41/5003 370/252
9,912,561 B1 * 3/2018 Chukka .................. H04L 43/10
(Continued)

FOREIGN PATENT DOCUMENTS

EP 1 610 495 A1 12/2005
EP 2 374 241 B1 8/2012
(Continued)

OTHER PUBLICATIONS

Cociglio et al., "New spin bit enabled measurements with one or two more bits", Feb. 28, 2019, TPPM Working Group, pp. 1-12. (Year: 2019).*
(Continued)

*Primary Examiner* — Redentor Pasia
(74) *Attorney, Agent, or Firm* — Oblon, McClelland, Maier & Neustadt, L.L.P.

(57) ABSTRACT

A method for enabling a round-trip packet loss measurement in a packet-switched communication network wherein a first node and a second node exchange packets comprising a packet loss field settable to an idle value or one or more measurement values. The first node performs a generation step whereby first packets having their set to a measurement value are transmitted to the second node. For each received first packet, the second node transmits back a second packet having its set to a measurement value. The first node then performs a reflection step whereby, for each received second packet, it transmits to the second node a respective third packet having its set to a measurement value. The time lapsing between start of the generation step and start of the reflection step has a predefined and substantially constant duration.

17 Claims, 6 Drawing Sheets

(56) References Cited

U.S. PATENT DOCUMENTS

| | | | | |
|---|---|---|---|---|
| 10,230,606 | B2 * | 3/2019 | Suzuki | H04L 47/36 |
| 2002/0054570 | A1 * | 5/2002 | Takeda | H04L 1/187 370/252 |
| 2005/0289395 | A1 | 12/2005 | Katsuyama et al. | |
| 2006/0034286 | A1 * | 2/2006 | Koning | H04L 69/163 370/394 |
| 2006/0268718 | A1 * | 11/2006 | Jones | H04L 43/12 370/235 |
| 2011/0255440 | A1 | 10/2011 | Cociglio et al. | |
| 2013/0195106 | A1 * | 8/2013 | Calmon | H04L 45/24 370/389 |
| 2014/0146686 | A1 * | 5/2014 | Sakurai | H04L 43/0829 370/241.1 |
| 2015/0271042 | A1 * | 9/2015 | Thapliya | H04L 47/11 370/253 |
| 2015/0373574 | A1 * | 12/2015 | Gordon | H04W 36/30 370/252 |
| 2016/0105353 | A1 * | 4/2016 | Cociglio | H04L 43/50 370/252 |
| 2019/0356557 | A1 * | 11/2019 | Burgio | H04L 47/34 |
| 2021/0006484 | A1 * | 1/2021 | Fan | G06F 11/0757 |
| 2021/0136729 | A1 * | 5/2021 | Yasukawa | H04L 1/1887 |
| 2021/0144078 | A1 * | 5/2021 | Mirsky | H04L 69/166 |
| 2021/0203578 | A1 * | 7/2021 | Li | H04L 43/04 |

FOREIGN PATENT DOCUMENTS

| | | | | |
|---|---|---|---|---|
| EP | 3 005 622 | B1 | 9/2018 | |
| WO | WO 2010/072251 | A1 | 7/2010 | |
| WO | WO 2011/079857 | A1 | 7/2011 | |
| WO | WO 2013/174417 | A1 | 11/2013 | |
| WO | WO 2017/071779 | A1 | 5/2017 | |
| WO | WO 2018/072828 | A1 | 4/2018 | |
| WO | WO-2018050215 | A1 * | 8/2018 | H04L 41/5009 |

OTHER PUBLICATIONS

International Search Report issued Aug. 17, 2020 in PCT/EP2020/068007 filed Jun. 26, 2020, 4 pages.

Trammel, B., et al., "The Addition of a Spin Bit to the QUIC Transport Protocol draft-trammel-quic-spin-01", QUIC, 2017, pp. 1-22.

Cociglio, M., et al., "New Spin bit enable measurements with one or two ore nits draft-cfb-ippm-spinbit-new-measurements-00", 2019, TPPM Working Group, pp. 1-12.

Morton, A., "Round-Trip Packet Loss Metrics", Internet Engineering Task Force, 2012, pp. 1-14.

Capello, A., et al., "A packet based method for passive performance monitoring draft-tempia-opaawg-p3m-03.txt", Network Working Group, 2013, pp. 1-22.

* cited by examiner

ENABLING A ROUND-TRIP PACKET LOSS MEASUREMENT IN A PACKET-SWITCHED COMMUNICATION NETWORK

TECHNICAL FIELD

The present invention relates to the field of communication networks. In particular, the present invention relates to a method for enabling a round-trip packet loss measurement in a packet-switched communication network, and to a packet-switched network configured to implement such method.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Packets not always reach their destination nodes, i.e. they may be lost during transmission through the network. Packet loss is due to different reasons. For instance, a node or link may fail, or packets may be discarded by a node due to a congestion of its ports. Also, packets may be discarded by a node since they contain bit errors.

When a communication service (in particular, a real-time voice or data service such as call, conference call, video conference, etc.) is provided by means of a packet-switched network, a performance measurement in terms of packet loss, one-way delay and/or jitter on packet flows carrying the service provides an indication of the quality of service (QoS) perceived by the end users of the service. In addition, packet loss and high delay/jitter may require retransmission and then reduce the efficiency of the communication network. Therefore, measuring packet loss of packet flows in a communication network is of particular interest for network operators.

WO 2010/072251, in the name of the same Applicant, discloses a method for measuring packet loss on a packet flow which uses an alternate marking technique, whereby the packet flow to be measured is divided into blocks of packets comprising a first marking value (e.g. a dedicated marking bit in their header set to "1") and blocks of packets comprising a second marking value (e.g. e.g. a dedicated marking bit in their header set to "0"). The marking value is periodically switched, so that the blocks of packets with the first marking value are interleaved with the blocks of packets with the second marking value. Two measurement points are provided on the path of the marked packets. Each measurement point implements a couple of counters counting the number of packets with the first and second marking values, respectively. The packet loss between the two measurement points is calculated using the counter values.

As known, QUIC (Quick UDP Internet Connections) is a transport layer (layer 4) network protocol designed to support multiplexed connections between two endpoints over User Datagram Protocol (UDP). In order to manage reception sequence errors, the QUIC header comprises a packet number field, wherein a packet number is written in each packet upon its transmission.

B. Trammel et al.: Internet draft "The addition of a Spin Bit to the QUIC Transport Protocol draft-trammel-quic-spin-01", Dec. 13, 2017 describes the addition of a so-called "latency spin bit" (or, briefly, "spin bit") in the QUIC header, which allows RTT (round-trip time) measurements on two counter-propagating packet flows exchanged between two nodes. According to the Internet draft, both the nodes (also termed "client" and "server") initially transmit the respective packets with the value of their spin bits set to 0. The client starts an RTT measurement by setting the value of its spin bit to 1. This change of spin bit value may be seen as an edge in the spin bit signal transmitted from client to server. As the server receives such edge, it changes the value of its own spin bit from 0 to 1. This way, the server substantially reflects the edge of the spin bit signal back to the client. As the client receives the reflected edge of the spin bit signal from the server, it switches the value of its spin bit back to 0. This may be seen as another edge in the spin bit signal transmitted from client to server, which is received at the server and reflected back to the client as described above. A rough RTT may then be measured at any intermediate measurement point placed between client and server, as the duration of a spin bit period, namely of the time lapsing between passage in a same direction (e.g. from client to server) of two consecutive edges of the spin bit signal.

SUMMARY OF THE INVENTION

The Applicant has perceived the need to provide a method for enabling a packet loss measurement in a packet-switched communication network which—while the spin bit technique described above allows to measure a rough RTT—allows any intermediate measurement point placed between two nodes (e.g. client and server, according to the QUIC terminology) to measure a rough "round-trip packet loss" between the two nodes, where the expression "round-trip packet loss" indicates a measurement of the number of packets lost in two counter-propagating flows exchange between the two nodes.

The Applicant has noticed that such round-trip packet loss can not be measured as a sum of the one-way packet losses affecting the two counter-propagating flows and measured for example according to the above mentioned WO 2010/072251.

First of all, indeed, the measurement of each one-way packet loss would require two measurement points.

Moreover, the Applicant has noticed that a mere sum of the one-way packet losses would not take into account the fact that, typically, the two counter-propagating directions of a link (e.g. upstream and downstream) may exhibit very different packet rates, e.g. 1:10. Hence, during a marking period, the one-way packet loss may be measured on different numbers of packets in the two directions and, therefore, a same number of lost packets may have very different weights in the two directions.

For example, if 1 packet of 100 transmitted packets is lost in one direction (e.g. downstream) during a certain marking period and 1 packet of 10 transmitted packets is lost in the other direction (e.g. upstream) during the same marking period, a mere sum of the one-way packet losses would be 2 which, averaged on the overall number of transmitted packets 100+10, would provide a round-trip packet loss rate of 2/110.

As another example, if 2 packets are lost of 100 transmitted packets in the downstream direction and no packet is lost of 10 transmitted packets in the upstream direction, the mere sum of the one-way packet losses would be again 2. The round-trip packet loss rate would then be again 2/110, irrespective of the fact that—differently from the previous case—the lost packets are now all concentrated in the downstream direction having the higher packet rate, and then the loss weight is reduced.

In view of the above, the Applicant has tackled the problem of providing a method for enabling a packet loss measurement in a packet-switched communication network, which allows any intermediate measurement point placed between two nodes to measure a round-trip packet loss taking into account the fact that the packet rates in the two directions may be different.

In the following description and in the claims, the expression "enabling a performance measurement in a packet-switched communication network" will designate an operation of marking and/or conditioning packets exchanged between two nodes of the packet-switched communication network in such a way that a packet loss measurement can be made, possibly at intermediate nodes.

The Applicant has realized that, in order to provide an accurate measurement of the round-trip packet loss which takes in due account the different packet rates in the two counter-propagating directions, the measurement shall be performed on the same number of packets in both directions.

For example, if 1 packet of 100 transmitted packets is lost in one direction (e.g. downstream) during a certain marking period and 1 packet of 10 transmitted packets is lost in the other direction (e.g. upstream) during the same marking period, the measurement in the downstream direction will be performed on 10 packets only amongst the 100 transmitted ones. If the considered packets include the lost one (less probable case) the downstream packet loss is again 1, which provides a round-trip packet loss rate of 2/20. Otherwise (more probable case) the downstream packet loss is 0, which provides a round-trip packet loss rate of 1/20. By repeating such downstream measurement several times, an average downstream packet loss of 0.1 would be found, which would provide an average round-trip packet loss rate of 1.1/20.

If instead 2 packets are lost of 100 transmitted packets in the downstream direction and no packet is lost of 10 transmitted packets in the upstream direction, performing the measurement in the downstream direction on 10 packets only amongst the 100 transmitted ones provides, in case the considered packets include the lost ones (less probable case) the downstream packet loss is again 2, a round-trip packet loss rate of 2/20. Otherwise (more probable case) the downstream packet loss is 0, which provides a round-trip packet loss rate of 0. By repeating such downstream measurement several times, an average downstream packet loss of 0.2 would be found, which would provide an average round-trip packet loss rate of 0.2/20. It may be appreciated that this value is lower that the one obtained in the previous case (1.1/20), because it takes into account the fact that the lost packets are now all concentrated in the direction (downstream) having the higher packet rate, so that their weight is lower than in the previous case where the lost packets were equally distributed between both directions.

Such numeric examples clearly show that, if the one-way packet losses are measured on a same number of transmitted packets, the different packet rates in the two directions are duly taken into account, so that the number of lost packets in each direction has a 50% weight in the final value of the round-trip packet loss rate.

According to embodiments of the present invention, the above problem is then solved by a method wherein a first node and a second node of a communication network exchange packets comprising a packet loss field settable to either at least one idle value or at least one measurement value. The first node performs a generation step whereby it transmits to the second node first packets having their packet loss fields set to the at least one measurement value. For each one of the first packets received from the first node, the second node transmits back to the first node a respective second packet comprising the at least one measurement value. The first node then performs a reflection step whereby, for each one of the second packets received from the second node, it transmits to the second node a respective third packet comprising the at least one measurement value. The first node starts the reflection step after a predefined and substantially constant time T has lapsed since start of the generation step.

A measurement point may then count the number of first packets and the number of third packets transmitted from the first node to the second node, based on which a round-trip packet loss measurement can then be performed. It shall be noticed that the measurement point may be implemented and operated by an entity other than the entity managing the setting of the packet loss field of the packets at the first and second nodes of the communication network.

Hence, advantageously, since the first and third packets upon which the measurement is carried out are transmitted in a same direction (namely, from the first node to the second node), the round-trip packet loss may be measured by a single measurement point located between the first and second node and configured to detect packets in that direction.

Further, since the third packets are obtained by a double reflection—at the second node and then at the first node—of the first packets, the measurement of the round-trip packet loss is advantageously performed on a same number of packets (short of lost packets) transmitted in both directions between the first and second node, independently of the packet rates in the two directions. Hence, as discussed above, the measurements are accurate even when the two directions exhibit different packet rates.

Further, since the time T lapsing between start of the generation step and start of the reflection step has a predefined and substantially constant duration, the round-trip packet loss measurement is advantageously totally decoupled from the RTT or—in other words—the intermediate measurement point can not derive any information on the RTT from the features of the detected first and third packets exchanged between first and second node. This is advantageous because the RTT measurement provides a rough indication of the distance between client and server, which distance could in turn be used to determine other information on the client—such as its position—which might be critical from the privacy point of view.

Moreover, since the time T lapsing between start of the generation step and start of the reflection step has a predefined and substantially constant duration, the implementation of the count of the number first and third packets at the measurement point is advantageously simpler than in case of a transmission gap of variable duration.

According to a first aspect, the present invention provides a method for enabling a round-trip packet loss measurement in a packet-switched communication network, the method comprising exchanging between a first node and a second node of the communication network packets comprising a packet loss field, wherein the packet loss field is settable to either at least one idle value or at least one measurement value, the exchanging comprising:

a) by the first node performing a generation step comprising transmitting to the second node first packets having the packet loss field set to the at least one measurement value;
b) by the second node, for each one of the first packets having the packet loss field set to the at least one measurement value and received from the first node, transmitting to the first node a respective second packet having the packet loss field set to the at least one measurement value; and c) by the first node, performing a reflection step comprising, for each one of the second packets having the packet loss field set to the at least one measurement value and received from the second node, transmitting to the second node a respective third packet having the packet loss field set to the at least one measurement value, wherein a time T lapsing between start of the generation step and start of the reflection step has a predefined and substantially constant duration T.

Preferably, the time T is set to a value higher than a previously measured maximum round-trip time on the link between the first node and the second node.

Preferably, the generation step has a predefined and substantially constant duration $T_G$.

According to an embodiment, the generation step comprises using only a percentage of the duration $T_G$ for transmitting to the second node first packets having the packet loss field set to the at least one measurement value.

According to a variant of such embodiment, step a) further comprises dynamically adjusting the percentage of the duration $T_G$ used for transmitting to the second node first packets having the packet loss field set to the at least one measurement value.

According to an embodiment, the reflection step has a predefined and substantially constant duration $T_R$, the reflection step being terminated upon expiry of the duration $T_R$ irrespective of whether a respective third packet with the packet loss field set to the at least one measurement value has been transmitted for each one of the second packets received from the second node.

According to a variant of this embodiment, the method further comprises, at the first node, checking whether a respective third packet with the packet loss field set to the at least one measurement value has been transmitted for each one of the second packets received from the second node and, in the negative, introducing an anomaly in the transmission of the first packets and/or third packets indicating that the packet loss round-trip measurement is not valid.

According to another embodiment, the reflection step is terminated when it is determined that a respective third packet with the packet loss field set to the at least one measurement value has been transmitted for each one of the second packets received from the second node.

According to an embodiment, the packet loss field is settable to any of at least one idle value and two alternative measurement values comprising a generation measurement value B and a reflection measurement value D, and:

the generation step comprises transmitting to the second node first packets having the packet loss field set to the generation measurement value B; and the reflection step comprises, upon reception from the second node of each one of the second packets, transmitting to the second node a respective third packet having the packet loss field set to the reflection measurement value, the reflection step being started upon termination of the generation step with no pause between the generation step and the reflection step.

According to another embodiment, the packet loss field is settable to any of a idle value and a measurement value, the method further comprising, at the first node:

performing a first pause between the generation step and the reflection step, the first pause having a predefined and substantially constant duration $T_G'$; and performing a second pause after the reflection step, the second pause having a predefined and substantially constant duration $T_R'$, wherein the first pause and the second pause comprise keeping the packet loss field of packets to be transmitted equal to the idle value.

According to a variant of this embodiment, the method further comprises, at the first node:

during the first pause or the reflection step, starting to ignore packets received from the second node having the packet loss field set to the measurement value after no packet having the packet loss field equal to the measurement value has been received for a time gap having a predefined duration; and during the second pause or a next generation step, stopping to ignore packets received from the second node having the packet loss field set to the measurement value after no packet (having the packet loss field equal to the measurement value has been received for a further time gap having a further predefined duration.

According to an embodiment, at the generation step and/or the reflection step, setting the packet loss field of a packet to be transmitted to the second node equal to the at least one measurement value is in response to reception of a packet from the second node.

According to a second aspect, the present invention provides a method for performing a round-trip packet loss measurement in a packet-switched communication network, the method comprising the steps of the method as set forth above and:

d) at a measurement point, counting the number of first packets and counting the number of third packets, the round-trip packet loss measurement being based on the number of first packets and the number of third packets.

According to a third aspect, the present invention provides a method for exchanging packets between a first node and a second node of a packet-switched communication network, the packets comprising a packet loss field, wherein the packet loss field is settable to either at least one idle value or at least one measurement value, the exchanging comprising:

a) by the first node, performing a generation step comprising transmitting to the second node first packets having the packet loss field set to the at least one measurement value;

b) by the second node, for each one of the first packets having the packet loss field set to the at least one measurement value and received from the first node, transmitting to the first node a respective second packet having the packet loss field set to the at least one measurement value; and c) by the first node, performing a reflection step comprising, for each one of the second packets having the packet loss field set to the at least one measurement value and received from the second node, transmitting to the second node a respective third packet having the packet loss field set to the at least one measurement value, wherein a time T lapsing between start of the generation step and start of the reflection step has a predefined and substantially constant duration T.

According to a fourth aspect, the present invention provides a packet-switched communication network comprising a first node and a second node configured to exchange packets comprising a packet loss field, wherein the packet loss field is settable to either at least one idle value or at least one measurement value, wherein:

a) the first node is configured to perform a generation step comprising transmitting to the second node first packets having the packet loss field set to the at least one measurement value;

b) the second node is configured to, for each one of the first packets having the packet loss field set to the at least one measurement value and received from the first node, transmit to the first node a respective second packet having the packet loss field set to the at least one measurement value; and c) the first node is further configure to perform a reflection step comprising, for each one of the second packets having the packet loss field set to the at least one measurement value and received from the second node, transmitting to the second node a respective third packet having the packet loss field set to the at least one measurement value, wherein a time T lapsing between start of the generation step and start of the reflection step has a predefined and substantially constant duration T.

Preferably, the packet-switched communication network further comprises at least one measurement point configured to count a number of first packets and count a number of third packets, a round-trip packet loss measurement being based on the number of first packets and the number of third packets.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
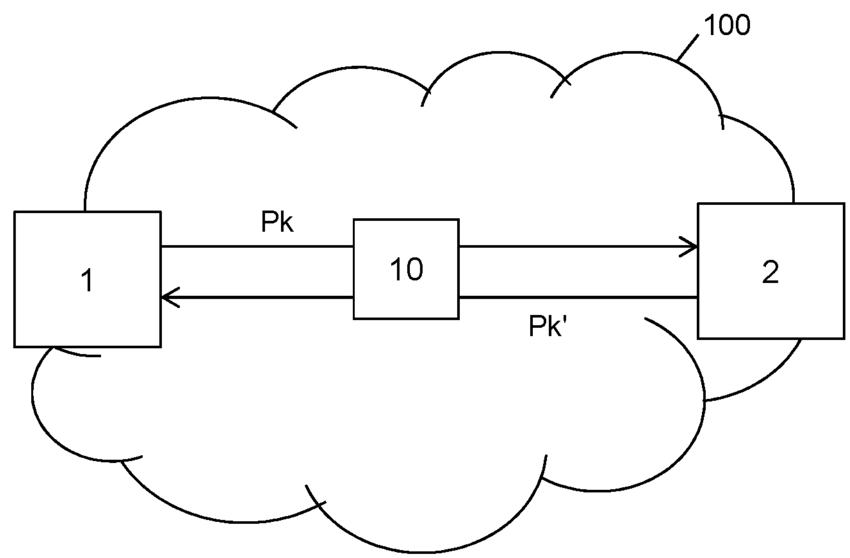
FIG. 1 schematically shows a packet-switched communication network in which the method for enabling a round-trip packet loss measurements according to embodiments of the present invention is implemented.

FIG. 1 schematically shows a packet-switched communication network 100 configured to enable round-trip packet loss measurements according to an embodiment of the present invention.

The communication network 100 comprises a plurality of nodes reciprocally interconnected by physical links according to any known topology, including two nodes 1 and 2 shown in FIG. 1. The nodes 1 and 2 may be connected by a single physical link or by the concatenation of several physical links and intermediate nodes (not shown in the drawings). The communication network 100 may be for instance an IP network.

The node 1 is configured to transmit packets Pk to the node 2, while the node 2 is configured to transmit packets Pk' to the node 1, as schematically depicted in FIG. 1. The packets Pk may belong to a same packet flow (namely, they may all have a same source address and a same destination address) or to different packet flows whose paths are overlapping between the nodes 1 and 2. Similarly, the packets Pk' may belong to a same packet flow or to different packet flows whose paths are overlapping between the nodes 2 and 1.

The packets Pk, Pk' are formatted according to a certain network protocol. By way of non limiting example, the network protocol may be the above mentioned QUIC protocol.

Figure 2:
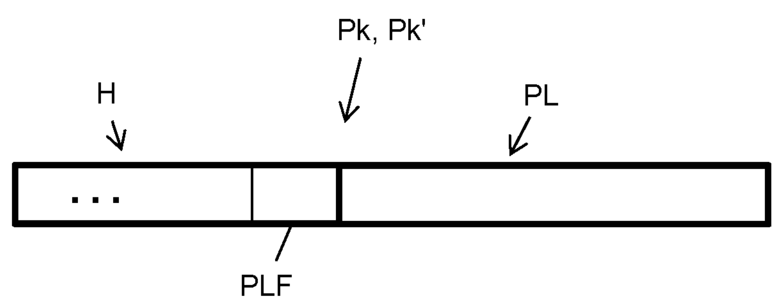
FIG. 2 schematically shows the structure of a packet exchanged in the communication network of FIG. 1, according to embodiments of the present invention.

As schematically depicted in FIG. 2, each packet Pk, Pk' comprises a payload PL and a header H. The payload PL comprises user data. The header H of each packet Pk, Pk' is formatted according to the network protocol supported by the network 100 and comprises packet forwarding information (not shown in FIG. 2), namely information allowing the nodes of the network 100 to properly handle the packets Pk, Pk' so that they reach their destination nodes.

According to embodiments of the present invention, the header H of each packet Pk, Pk' preferably also comprises a packet loss field PLF. The packet loss field PLF comprises one or more bits. The packet loss field PLF may be set to anyone of:

- at least one idle value (e.g. “0” in case of a one-bit packet loss field or “00” and “10” in case of a two-bit packet loss field); and
- at least one measurement value (e.g. “1” in case of a one-bit packet loss field or “01” and “11” in case of a two-bit packet loss field).

Figure 3:
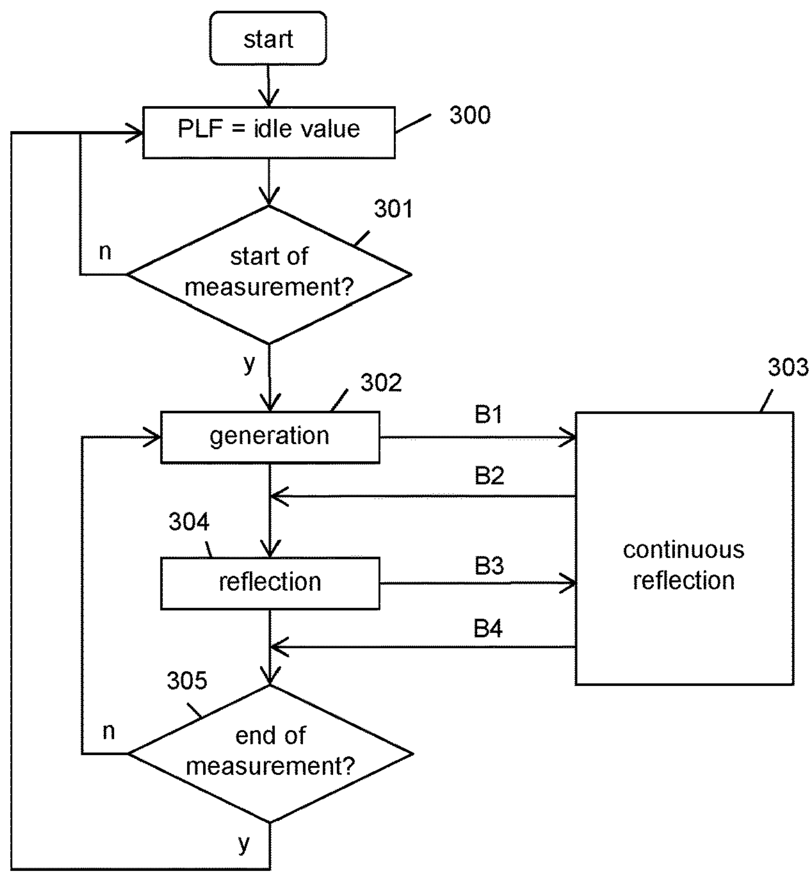
FIG. 3 is a flow chart of the operation of a first and second node of the communication network of FIG. 1, according to a first embodiment of the present invention.
Figure 4:
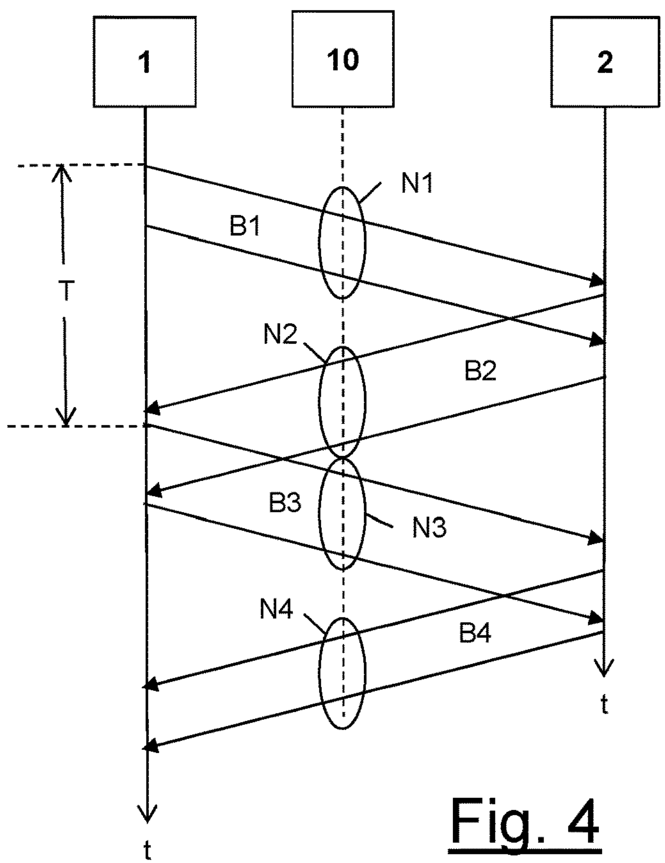
FIG. 4 schematically shows packets exchanged by the first and second node operating according to the flow chart of FIG. 3.

With reference to the flow chart of FIG. 3, the operation of the nodes 1 and 2 will be now described in detail, according to an embodiment of the present invention.

Preferably, the node 1 normally transmits to the node 2 packets Pk having their packet loss field PLF set to the idle value (step 300). Preferably, as the node 1 determines that a round-trip measurement shall be started (step 301), it preferably performs a generation step (step 302) which comprises transmitting to the node 2 a block B1 of packets Pk having their packet loss field PLF set to the measurement value (herein after, it is assumed that a single measurement value is used by the nodes 1 and 2, e.g. “1”).

As it will be discussed in detail herein after, the generation step 302 preferably has a predefined and substantially constant duration $T_G$. Hence, the node 1 preferably terminates the generation step 302 when it determines that the time $T_G$ has lapsed since its beginning. The number N1 of packets Pk in the block B1 therefore depends on $T_G$, on the packet rate from the node 1 to the node 2 and, preferably, also on the packet rate from the node 2 to the node 1, as it will be described in detail herein after.

The node 2 preferably continuously reflects towards the node 1 the value of the packet loss field PLF comprised in the packets Pk received from the node 1 (step 303). In particular, as the node 2 receives from the node 1 a packet Pk having its packet loss field PLF set to the idle value, it preferably sets to the idle value the packet loss field PLF of the next packet Pk' to be transmitted to the node 1. Similarly, as the node 2 receives from the node 1 a packet Pk having its packet loss field PLF set to the measurement value, it preferably sets to the measurement value the packet loss field PLF of the next packet Pk' to be transmitted to the node 1.

Therefore, when the node 2 receives the block B1 of packets Pk generated during the generation step 302, it preferably transmits back to the node 1 a block B2 of packets Pk' having their packet loss field PLF set to the measurement value. If no packet loss occurs in the transmission of block B1 from node 1 to node 2, the block B2 comprises the same number N2=N1 of packets Pk' as the block B1. If a packet loss occurred, instead, the number N2 of packets Pk' in the transmitted block B2 is lower than N1.

According to embodiments of the present invention, when a predefined and substantially constant time T, longer than or equal to the duration $T_G$ of the generation step, has lapsed since the beginning of the generation step 302, the node 1 preferably starts a reflection step (step 304). The time T is preferably longer than the maximum RTT on the link between the nodes 1 and 2, estimated before the round-trip packet loss measurement session is started (e.g., via the Ping technique or similar techniques, depending on the protocol used). This way, it is guaranteed that at least part of the block B2 has already been received at the node 1 when the reflection step 304 is started (short of packet loss affecting the packets Pk of the block B1 and/or the packets Pk' of the block B2).

During the reflection step 304, for each received packet Pk' of the block B2, the node 1 preferably sets to the measurement value the packet loss field PLF of a next packet Pk to be transmitted to the node 1. Then, at the reflection step 304 the node 1 basically transmits to the node 2 a block B3 of packets Pk having their packet loss field PLF set to the measurement value. If no packet loss occurs, the block B3 comprises the same number N3=N2 of packets Pk as the block B2. If a packet loss occurred, instead, the number N3 of packets Pk in the block B3 is lower than N2.

The reflection step 304 has a duration $T_R$. The duration $T_R$ may be predefined. In this first case, the node 1 preferably terminates the reflection step 304 when it determines that the duration $T_R$ has lapsed, irrespective of whether the whole block B2 has been reflected or not, namely irrespective of whether a packet Pk with packet loss field PLF equal to the measurement value has been transmitted for each one of the received packets Pk' of the block B2. Otherwise, the node 1 may continue the reflection step 304 until it determines that the whole block B2 of packets Pk' has been reflected. In this case, the duration $T_R$ of the reflection step is variable.

When the node 2 receives the block B3 of packets Pk generated during the reflection step 304, it preferably transmits back to the node 1 a block B4 of packets Pk' having their packet loss field PLF set to the measurement value, as a result of its above described continuously reflecting behaviour 303. If no packet loss occurs, the block B4 comprises the same number N4=N3 of packets Pk' as the block B3. If a packet loss occurred, instead, the number N4 of packets Pk' in the block B4 is lower than N3.

Upon completion of the reflection step 304, the node 1 preferably determines if the round-trip packet loss measurement shall be terminated or not (step 305).

In the affirmative, the node 1 preferably reverts to step 300, namely it continues transmitting to the node 2 packets Pk having their packet loss field PLF set to the idle value.

In the negative, the node 1 preferably reverts to the generation step 302, thereby transmitting to the node 2 a new block B1 of packets Pk having their packet loss field PLF set to the measurement value, which will then undergo the above described steps 303 and 304.

Hence, at each iteration of steps 301-304 performed between start and end of the measurement session, the nodes 1 and 2 exchange four blocks B1, B2, B3, B4 of packets having their packet loss field PLF set to the measurement value. If no packet loss occurs, the blocks B1, B2, B3, B4 comprise a same number of packets.

In order to perform a round-trip packet loss measurement between the nodes 1 and 2, a measurement point 10 may be provided in an intermediate position between the nodes 1 and 2, as schematically depicted in FIG. 1. This is not limiting. The measurement point 10 may be also provided at the node 1 or 2.

The measurement point 10 may be configured to detect packets Pk transmitted in the direction from the node 1 to the node 2 and count the number N1 of packets Pk in the block B1 and the number N3 of packets Pk in the block B3. The round-trip packet loss between the nodes 1 and 2 may then be calculated as the difference N1-N3. The calculation may be repeated for each pair of blocks B1-B3, thereby providing a periodic monitoring of the round-trip packet loss.

If instead the measurement point 10 is configured to detect packets Pk' transmitted in the opposite direction from the node 2 to the node 1, the measurement point 10 preferably counts the number N2 of packets Pk' in the block B2 and the number N4 of packets Pk' in the block B4. The round-trip packet loss between the nodes 1 and 2 in this case may then be calculated as the difference N2–N4. The calculation may be repeated for each pair of blocks B2-B4, thereby providing a periodic monitoring of the round-trip packet loss.

In any case, the obtained packet loss measurement is "round-trip" in that it does not provide any indication as to the distribution of the lost packets between the two directions.

However, since each block B3 of packets Pk is obtained by a double reflection—at the node 2 and then at the node 1—of a respective block B1 of packets Pk (and, similarly, in the opposite direction each block B4 of packets Pk' is obtained by a double reflection—at the node 1 and then at the node 2—of a respective block B2 of packets Pk'), the measurement of the round-trip packet loss is advantageously performed on a same number of packets transmitted in both directions between the nodes 1 and 2, independently of the packet rates in the two directions. Hence, as discussed above, the measurements are accurate even when the two directions exhibit different packet rates.

Further, since the time T lapsing between start of the generation step 302 and start of the reflection step 304 is predefined and substantially constant, it may be set to a value unrelated from the actual RTT of the packets in the blocks B1, B2, B3 and B4 between the nodes 1 and 2. This advantageously makes the round-trip packet loss measurement totally decoupled from the actual RTT of the packets in the blocks B1, B2, B3 and B4 between the nodes 1 and 2. The time features of the blocks B1 and B3 (or B2 and B4) as detected by the measurement point 10 (namely, the time distance between their respective first packets Pk, their durations, etc.) are indeed dependent only from the time T and packet rates. Hence, the measurement point 10 can not derive any information on the RTT between the nodes 1 and 2 from the time features of the packets Pk forming the blocks B1 and B3 (or from the time features of the packets Pk' forming the blocks B2 and B4). This is advantageous because the RTT measurement provides a rough indication of the distance between the node 1 and the node 2, which distance could in turn be used to determine other information on the node 1 and/or 2—such as their positions—which might be critical from the privacy point of view.

Moreover, since the time T lapsing between start of the generation step 302 and start of the reflection step 304 is predefined and substantially constant, the implementation of the count of the numbers of packets Pk forming the blocks B1 and B3 (or B2 and B4) at the measurement point 10 is advantageously periodic with a fixed period, and then it is simpler than in case of a transmission gap of variable duration.

The Applicant has noticed that, due to very different packet rates in the two directions, the reflection at the node transmitting at the lower packet rate may take a too long time. For example, if the packet rate from the node 2 to the node 1 is 1/10 the packet rate from the node 1 to the node 2, a too long time may lapse before the node 2 transmits N2=N1 packets Pk' with their packet loss field PLF set to the measurement value. This is undesirable because, in order to monitor the round-trip packet loss, a measurement period of the order of magnitude of tens-hundreds of milliseconds is typically desired.

Furthermore, it is advantageous to guarantee that the measurement point 10 is capable of properly distinguishing packets Pk or Pk' transmitted in the same direction and belonging to different blocks B1, B3 or B2, B4. Otherwise, the measurement point 10 can not count in the proper way the number of packets N1, N3 or N2, N4 belonging to the two blocks and, hence, can not provide a correct value of the round-trip packet loss.

Figure 5:
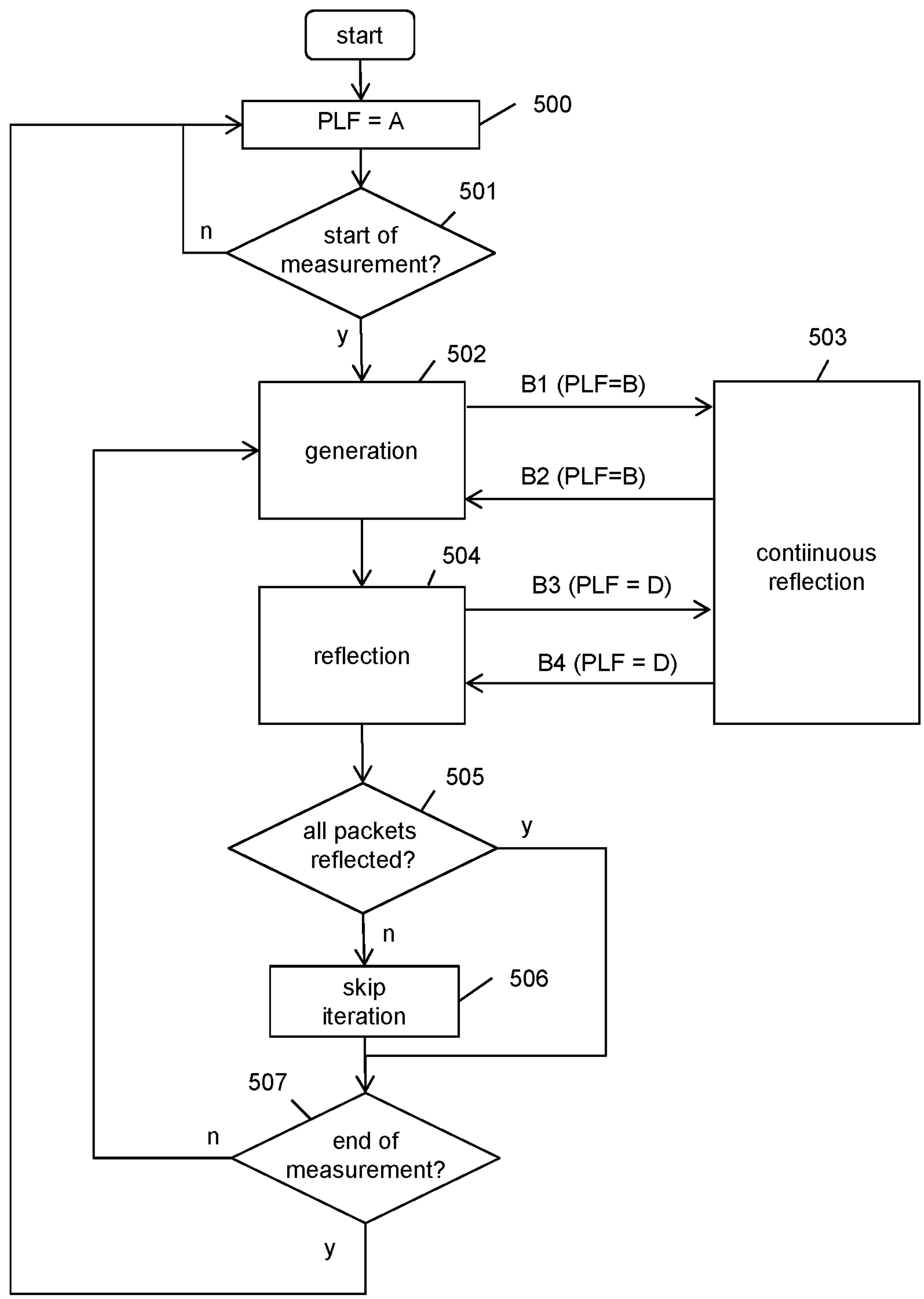
FIG. 5 is a flow chart of the operation of a first and second node of the communication network of FIG. 1, according to a second embodiment of the present invention.

FIG. 5 is a flow chart showing the operation of the nodes 1 and 2 according to an embodiment of the present invention.

According to such embodiment, the nodes 1 and 2 preferably use at least one idle value and two alternative measurement values for the packet loss field PLF of the exchanged packets Pk and Pk'. Hence, the packet loss field PLF may be a two-bit field which may be set to:

- a generation idle value A (e.g. "00") or a generation measurement value B (e.g. "01"); or
- a reflection idle value C (e.g. "10") or a reflection measurement value D (e.g. "11").

Preferably, the node 1 normally transmits to the node 2 packets Pk having their packet loss field PLF set to the generation idle value A (step 500).

Preferably, as the node 1 determines that a round-trip measurement shall be started (step 501), it performs a generation step 502. The generation step 502 preferably comprises setting the packet loss field PLF of the next packet Pk to be transmitted equal to the generation measurement value B each time a packet Pk' is received from the node 2, independently of the value of its packet loss field PLF.

For example, the generation step 502 may be performed by the node 1 by means of a generation counter, which the node 1 increases by 1 each time a packet Pk' is received from the node 2, independently of the value comprised in its packet loss field. Each time the node 1 has to transmit a packet Pk, it preferably checks whether the generation counter is higher than 0. If the generation counter is higher than 0, the node 1 preferably sets the packet loss field PLF of the packet Pk to be transmitted equal to the generation measurement value B and decreases the generation counter by 1. If instead the generation counter is equal to 0, the node 1 preferably leaves the packet loss field PLF of the packet Pk to be transmitted equal to the generation idle value A and does not decrease the generation counter.

The generation step 502 preferably has a predefined and substantially constant duration $T_G$, which may be counted by a local timer of the node 1. For terminating the generation step 502 upon expiration of the duration $T_G$, the node 1 preferably forces the generation counter to zero, blocking the increase of the generation counter in case of further packets Pk' being received from node 2. The time $T_G$ is preferably longer than the maximum RTT on the link between the nodes 1 and 2, so as to guarantee that at least part of the block B2 has already been received at the node 1 when the subsequent reflection step 504 is started (short of packet loss affecting the packets Pk of the block B1 and/or the packets Pk' of the block B2). The maximum RTT is measured on the link between the nodes 1 and 2 before the round-trip packet loss measurement session is started, e.g. by the Ping technique or similar techniques, depending on the protocol used. $T_G$ may be equal e.g. to RTT+10% RTT. For example, $T_G$ may be set equal to 800 ms or 900 ms. Considering that the longest RTT on a known communication link is 1 second (satellite link), a $T_G$ comprised between 800 ms and 1100 ms (e.g. 900 ms) guarantees that the condition $T_G$>RTT is fulfilled for most types of communication links. For most terrestrial links (e.g. internal links within Europe or USA, or links between Europe and USA), where RTT is at most 100 ms, $T_G$ may be equal to e.g. 110 ms. For some intercontinental terrestrial links (e.g. London—New Zealand) RTT is at most 300 ms, hence $T_G$ may be equal to 330 ms. The generation step 502 then results in the node 1 transmitting to the node 2 a block B1 of packets Pk having their packet loss field PLF set to the generation measurement value B. The number N1 of packets Pk in the block B1 depends on $T_G$, on the packet rate from the node 1 to the node 2 and also on the packet rate from the node 2 to the node 1.

The packets Pk of the block B1 may be non contiguous. If the packet rate in the direction from the node 2 to the node 1 is lower than the packet rate from node 1 to node 2, indeed, during the generation step 502 some packets Pk will be transmitted from node 1 with their packet loss field PLF equal to the generation idle value A between reception of two consecutive packets Pk' from the node 2.

During the generation step 502 also a reflection counter is preferably used. The node 1 preferably increases the reflection counter by 1 each time a packet Pk' is received from the node 2 whose packet loss field PLF comprises the generation measurement value B.

The node 2 preferably continuously reflects towards the node 1 the value of the packet loss field PLF comprised in the packets Pk received from the node 1 (step 503). In particular, as the node 2 receives from the node 1 a packet Pk having its packet loss field PLF set to the generation idle value A, the generation measurement value B, the reflection idle value C or the reflection measurement value D, it preferably sets the packet loss field PLF of the next packet Pk' to be transmitted to the node 1 equal to the same value as the received packet Pk.

According to an embodiment, step 503 is performed by implementing at the node 2 two counters, namely one counter for the generation measurement value B and one counter for the reflection measurement value D. Each counter preferably is associated with the sequence number comprised in the header of the first received packet Pk with packet loss field PLF equal to B and D, respectively. For each packet Pk' to be transmitted to the node 1, the node 2 preferably checks the sequence numbers associated with the two counters, sets the packet loss field PLF of the packet Pk' equal to the measurement value B or D whose counter has associated the lowest sequence number and decreases the respective counter by 1. When a counter is equal to 0, the associated sequence number is cancelled. This way, the node 2 advantageously eliminates possible reception sequence errors between packets Pk with different measurement values B and D, by completing reflection of a measurement value before starting reflection of the other one.

If, for a packet Pk' to be transmitted, the node 2 determines that both the counters are equal to zero:

if the last received packet Pk has packet loss field PLF equal to A or B, the node 2 preferably sets the packet loss field PLF of the packet Pk' equal to A; and if the last received packet Pk has packet loss field PLF equal to C or D, the node 2 preferably sets the packet loss field PLF of the packet Pk' equal to C.

Therefore, while the node 2 is receiving the block B1 of packets Pk generated during the generation step 502 (possibly interleaved with packets Pk with packet loss field PLF equal to the generation idle value A), it preferably transmits back to the node 1 a block B2 of packets Pk' having their packet loss field PLF set to the generation measurement value B (possibly interleaved with packets Pk' with packet loss field PLF equal to the generation idle value A). If no packet loss occurs, the block B2 comprises the same number N2=N1 of packets Pk' as the block B1. If a packet loss occurred, instead, the number N2 of packets Pk' in the block B2 is lower than N1.

Upon termination of the generation step 502, the node 1 preferably starts a reflection step 504, which comprises transmitting a packet Pk with packet loss field PLF comprising the reflection measurement value D for each received packet Pk' of the block B2, whose packet loss field PLF comprises the generation measurement value B. Hence, at the reflection step 504, the node 1 basically transmits to the node 2 a block B3 of packets Pk having their packet loss field PLF set to the reflection measurement value D.

Since the reflection step 504 immediately follows the generation step 502, the time T lapsing between start of the generation step 502 and start of the reflection step 504 is substantially equal to the duration $T_G$ of the generation step 502.

In order to perform the reflection step 504, as described above the node 1 implements a reflection counter which it increases by 1 each time a packet Pk' with packet loss field PLF equal to the generation measurement value B is received. Increase of the reflection counter starts during the generation step 502, since its duration $T_G$ is preferably longer than the RTT between the nodes 1 and 2, and continues during the reflection step 504.

During the reflection step 504, when the node 1 has to transmit a packet Pk, it preferably checks whether the reflection counter value is higher than 0. In the affirmative, the node 1 preferably sets the packet loss field PLF of the packet Pk to be transmitted equal to the reflection measurement value D and decreases the reflection counter by 1. If instead the reflection counter is equal to 0, the node 1 preferably sets the packet loss field PLF of the packet Pk to be transmitted equal to the reflection idle value C.

The reflection step 504 may end when a packet Pk with PLF equal to D has been transmitted for each received packet Pk' of the block B2, namely when the reflection counter reaches the value 0. In this case, the duration $T_R$ of the reflection step 504 is variable and depends on the RTT between the nodes 1 and 2 and on the packet rates in the two directions.

Otherwise, the reflection step 504 may have a predefined and substantially constant duration $T_R$, which may be counted by the local timer of the node 1. In this case, the node 1 terminates the reflection step 504 when it determines that the time $T_R$ has lapsed. If all the packets Pk' of the block B2 have been reflected before lapse of $T_R$, at the end of the reflection step 504 the reflection counter reaches the value 0. Otherwise, the node 1 anyway forces the value of the reflection counter to 0. The predefined duration $T_R$ is preferably set longer than the duration $T_G$ of the generation step 502, so as to minimize the risk that not all the packets Pk' of the block B2 have been reflected before lapse of $T_R$.

While the node 2 is receiving the block B3 of packets Pk generated during the reflection step 504 (possibly interleaved with packets Pk with packet loss field PLF equal to the generation idle value C), it preferably transmits back to the node 1 a block B4 of packets Pk' having their packet loss field PLF set to the reflection measurement value D, as described above (step 503) (possibly interleaved with packets Pk' with packet loss field PLF equal to the generation idle value C).

In the meanwhile, at the end of the reflection step 504, the node 1 preferably determines if all the packets Pk' of the block B2 have been reflected, namely if a packet Pk with PLF equal to D has been transmitted for each received packet Pk' of the block B2 (step 505).

In the affirmative the node 1 preferably reverts to the generation step 502, until the end of the measurement session (step 507).

In the negative, the node 1 preferably skips an iteration of the algorithm of FIG. 5 (step 506). In other words, for a period of duration $T_G$ following the end of the reflection step 504 the node 1 preferably transmits only packets Pk with packet loss field PLF equal to the generation idle value A. This way, the node 1 advantageously introduces a pause or anomaly in the periodicity of the transmission of the blocks of packets B1, B2, B3, B4, which may be detected by the measurement point 10. This way, the measurement point 10 may be informed that the number N1 of packets Pk in the block B1 and the number N3 of packets Pk in the double-reflected block B3 (or the number N2 of packets Pk' in the block B2 and the number N4 of packets Pk' in the double-reflected block B4) detected at the iteration preceding the pause or anomaly are not mutually consistent, and that accordingly the round-trip packet loss measurement relating to the previous iteration is invalid.

For performing step 506, the node 1 may implement a variable ComplRifl settable to any of two alternative values, namely one value (e.g. "true") indicating that all the packets Pk' of the block B2 have been reflected at the reflection step 504 and another value (e.g. "false") indicating that not all the packets Pk' of the block B2 have been reflected at the reflection step 504. At step 505, the node 1 preferably determines whether all the packets Pk' of the block B2 have been reflected during the reflection step 504 by checking the value of the reflection counter and sets the value of the variable ComplRifl accordingly. Before starting each iteration of the generation step 502, the node 1 preferably checks the value of the variable ComplRifl. If the value is "true", the node 1 preferably performs the generation step 502 and reflection step 504 as described above. If instead the value is "false", the node 1 preferably prevents the generation of a new block B1 of packets Pk by keeping the value of the generation counter equal to 0 for the whole duration $T_G$ of the generation step 502. Then, the node 1 preferably switches the variable ComplRifl to its value "true", so that the still next iteration of the generation step 502 will result in the transmission of a new block B1 of packets Pk.

Skipping an algorithm iteration is one exemplary technique for informing the measurement point 10 of the measurement invalidity at an iteration of the algorithm. According to other embodiments, the node 1 may use other techniques for this purpose. For example, the header of the packets Pk, Pk' may comprise an additional bit for this purpose, which—in the packets Pk—the node 1 normally sets to a first value (e.g. 0) if the outcome of check 505 is positive and to a second value (e.g. 1) if the outcome is negative. The node 2 preferably reflects also the value of this additional bit in the packets Pk'. This way, the measurement point 10 may determine if the measurement at the previous iteration is valid of not based on the value of such additional bit.

Hence, at each iteration of the algorithm of FIG. 5, the packets Pk of the block B1 and the packets Pk of the block B3 have different measurement values B and D. Also the packets Pk possibly interleaved with those of the block B1 and the packets Pk possibly interleaved with those of the block B3 have different idle values A and C.

Use of two different measurement values B and D advantageously allows the measurement point 10 to properly distinguish packets Pk belonging to block B1 from packets Pk belonging to block B3, and then to properly count them. This advantageously allows monitoring ½ of the average of the packets Pk or Pk' transmitted in the direction with lower packet rate.

Figure 6:
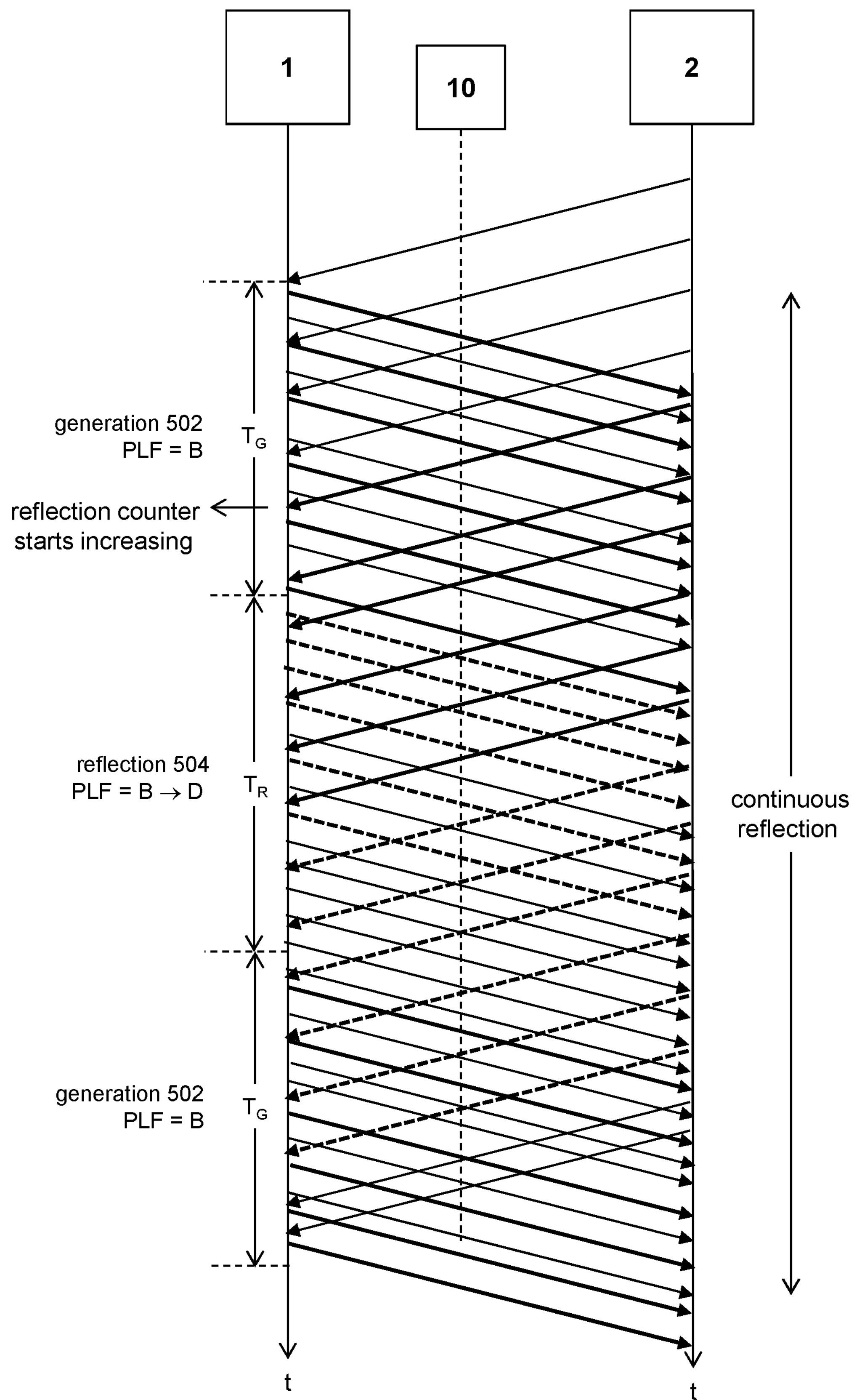
FIG. 6 schematically shows packets exchanged by the first and second node operating according to the flow chart of FIG. 5.

FIG. 6 shows an exemplary exchange of packets between two nodes 1 and 2 operating according to the flow chart of FIG. 5, under the assumption that the packet rate in the direction from node 2 to node 1 is roughly half the packet rate in the direction from node 1 to node 2. In FIG. 6, packets Pk and Pk' whose packet loss field PLF is equal to either measurement values B or D are represented by thick lines (continuous and dashed, respectively).

In FIG. 6 it may be seen that during a first iteration of the generation step 502 a block B1 of N1=6 packets Pk with packet loss field PLF equal to the generation measurement value B is generated, each packet Pk of the block B1 being transmitted in response to reception of a respective packet Pk' from the node 2 whose packet loss field PLF is equal to the generation idle value A. Due to the higher packet rate, the packets Pk of the block B1 are interleaved with packets Pk whose packet loss field PLF is equal to the generation idle value A.

If no packet loss occurs, the node 2 reflects back a block B2 of N2=6 packets Pk' with packet loss field PLF equal to the generation measurement value B. Due to the lower packet rate, the packets Pk' of the block B2 are not interleaved with any packet Pk' whose packet loss field PLF is equal to the generation idle value A.

As the node 1 determines that a time $T_G$ has lapsed, it ends the generation step 502 and enters the reflection step 504. It may be appreciated that, since the duration $T_G$ is longer than the RTT, two packets Pk' of the block B2 are received at the node 1 while the generation step 502 is still ongoing. The node 1 accordingly increases the reflection counter during the generation step 502.

During the reflection step 504, the node 1 transmits back to the node 2 a block B3 packets Pk with packet loss field PLF equal to the reflection measurement value D. In FIG. 6 it is assumed that the reflection step 504 has a predefined duration $T_R$ long enough to allow the node 1 completing reflection of the whole block B2 of packets Pk'. Then, if no packet loss occurs, the block B3 comprises N3=6 packets Pk with packet loss field PLF equal to the reflection measurement value D.

Then, if no packet loss occurs, the node 2 reflects back a block B4 of N4=6 packets Pk' with packet loss field PLF equal to the reflection measurement value D to the node 1.

The node 1 then performs another generation step 502, by generating a new block B1 of N1=6 packets Pk with packet loss field PLF equal to the generation measurement value B, each packet Pk of the block B1 being transmitted in response to reception of a respective packet Pk' from the node 2, independently of the value of its packet loss field PLF. And so on.

The measurement point 10 may then perform a round-trip packet loss measurement by counting the number N1 of packets Pk of the block B1, the number N3 of packets Pk of the block B3 and then calculating a round-trip packet loss as the difference between N1 and N3. In the opposite direction, the measurement point 10 may perform a round-trip packet loss measurement by counting the number N2 of packets Pk' of the block B2, the number N4 of packets Pk' of the block B4 and then calculating a round-trip packet loss as the difference between N2 and N4.

More specifically, with reference for example to the direction from the node 1 to the node 2, the measurement point 10 may implement 2 counters C(B) and C(D) (namely, one for each measurement value B and D), each one counting the number of detected packets Pk having their packet loss field PLF equal to the respective measurement value B or D. Hence, the measurement point 10 preferably increases the counter C(B) or C(D) each time it detects a packet Pk with packet loss field PLF equal to the measurement value B or D.

Preferably, when the measurement point 10 detects the first packet Pk whose packet loss field PLF comprises the measurement value B (or D), it preferably waits a time T/2, then reads the value of the counter C(D) (or C(B)) and then waits for the first packet Pk whose packet loss field PLF comprises the other measurement value D (or B). This way, the risk that the value of the counters C(B) and C(D) are not fixed at the time each counter is read is advantageously minimized.

Then, the measurement point 10 may calculate a round-trip packet loss as a difference between the last read value of the counter C(D) and the last read value of the counter C(B).

It may be appreciated that, since at the generation step 502 the node 1 transmits a packet Pk of the block B1 only upon reception of a packet Pk from the node 2, the number of packets Pk of the block B1 is such that reflection 503 can be managed by the node 2 in a reasonable time, even when the packet rate from the node 2 is much lower than the packet rate from the node 1. This allows avoiding congestions at the node 2.

Further, since the time $T=T_G$ lapsing between start of the generation step 502 and start of the reflection step 504 is predefined, it may be set to a value unrelated from the actual RTT of the packets in the blocks B1, B2, B3 and B4 between the nodes 1 and 2. As discussed above, this advantageously makes the round-trip packet loss measurement totally decoupled from the RTT between the nodes 1 and 2.

Moreover, since the time $T=T_G$ lapsing between start of the generation step 502 and start of the reflection step 504 is predefined and substantially constant, the implementation of the count of the numbers of packets Pk forming the blocks B1 and B3 (or B2 and B4) at the measurement point 10 is advantageously periodic with a fixed period, and then it is simpler to implement than in case e.g. of a transmission gap of variable duration.

According to an advantageous variant, the node 1 preferably uses only part of the time $T_G$ for transmitting the block B1. For example, the node 1 may stop transmission of the packets Pk of the block B1 by forcing the generation counter to 0 after e.g. 80% $T_G$ has lapsed since the beginning of the generation step 502. In case the reflection step 504 has a predefined duration $T_R$, this advantageously reduces the risk that, due to a reduction of the packet rate in the direction from node 1 to node 2, the node 1 is not capable of completing reflection of all the packets Pk' of the block B2.

According to a particularly advantageous variant, the node 1 may dynamically adjust the percentage of the duration $T_G$ used for the generation of the block B1 based on the outcome of the check 505 described above. In particular, at the first iteration of the algorithm of FIG. 5 the percentage may be set to an initial value, e.g. 50%. If, after performing the generation step 502 and reflection step 504, the node 1 determines that not all the packets Pk' of the block B2 have been reflected, after skipping an iteration (step 506) the node 1 may decrease the percentage, e.g. by 10%. If instead the node 1 determines that all the packets Pk' of the block B2 have been reflected, the node 1 may increase the percentage, e.g. by 10%, before reverting to the generation step 502. The percentage may be increased up to a maximum threshold, e.g. 90%, upon which the probability not to reflect all the packets Pk' of the block B2 becomes too high. The maximum threshold may be determined as follows.

In order to avoid instabilities of the algorithm in FIG. 5 (namely a situation wherein the algorithm continuously oscillates between iterations with a positive outcome of check 505 and iterations with a negative outcome of step 505), the node 1 may store the already used percentage values. If an oscillation is detected between two percentage values (e.g. positive outcome with 50%, negative outcome with 60%), the maximum threshold for the whole measurement session is set equal to the lower of the percentage values giving raise to the oscillation (50%, in the present example).

Figure 7:
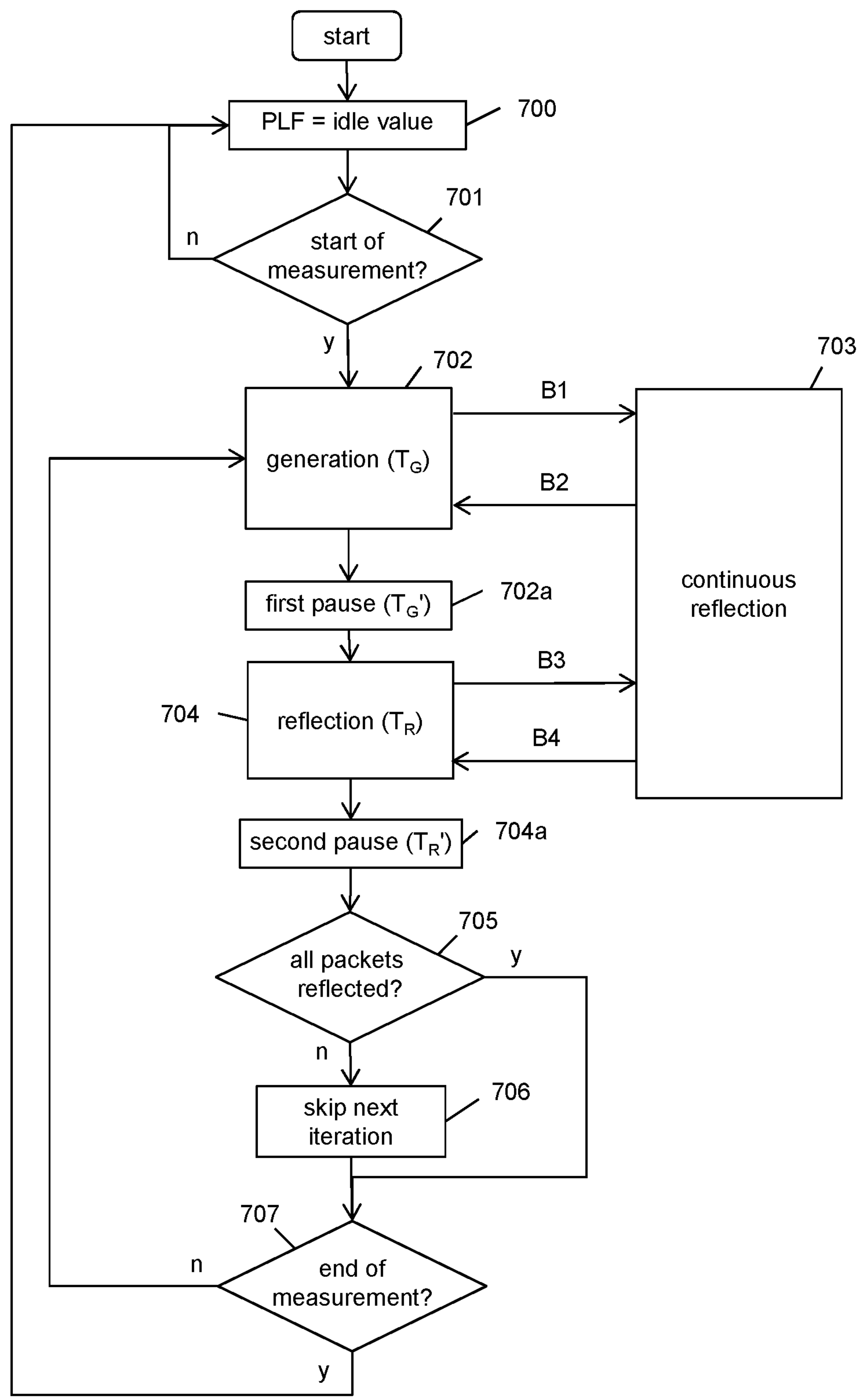
FIG. 7 is a flow chart of the operation of a first and second node of the communication network of FIG. 1, according to a third embodiment of the present invention.

FIG. 7 is a flow chart showing the operation of the nodes 1 and 2 according to another embodiment of the present invention.

According to such embodiment, the nodes 1 and 2 preferably use one idle value (e.g. “0”) and one measurement values (e.g. “1”) for the packet loss field PLF of the exchanged packets Pk and Pk'. Hence, the packet loss field PLF may be a one-bit field.

Preferably, the node 1 normally transmits to the node 2 packets Pk having their packet loss field PLF set to the idle value (step 700).

Preferably, as the node 1 determines that a round-trip measurement shall be started (step 701), it performs a generation step 702. The generation step 702 preferably comprises setting the packet loss field PLF of the next packet Pk to be transmitted equal to the measurement value each time a packet Pk' is received from the node 2, independently of the value of its packet loss field PLF.

For example, the generation step 702 may be performed by the node 1 by means of a generation counter, which the node 1 increases by 1 each time a packet Pk' is received from the node 2 after the start of the generation step, independently of the value comprised in its packet loss field. Each time the node 1 shall transmit a packet Pk, it preferably checks whether the generation counter is higher than 0. If the generation counter is higher than 0, the node 1 preferably sets the packet loss field PLF of the packet Pk to be transmitted equal to the measurement value and decreases the generation counter by 1. If instead the generation counter is equal to 0, the node 1 preferably leaves the packet loss field PLF of the packet Pk to be transmitted equal to the idle value and does not decrease the generation counter.

The generation step 702 preferably has a predefined and substantially constant duration $T_G$, which may be counted by a local timer of the node 1. For terminating the generation step 702 upon expiration of the duration $T_G$, the node 1 preferably forces the generation counter to zero.

The generation step 702 then results in the node 1 transmitting to the node 2 a block B1 of packets Pk having their packet loss field PLF set to the generation measurement value B. The number N1 of packets Pk in the block B1 depends on $T_G$, on the packet rate from the node 1 to the node 2 and also on the packet rate from the node 2 to the node 1.

The packets Pk of the block B1 may be non contiguous. If the packet rate in the direction from the node 2 to the node 1 is lower than the packet rate from node 1 to node 2, indeed, during the generation step 702 some packets Pk will be transmitted from node 1 with their packet loss field PLF equal to the idle value between reception of two consecutive packets Pk' from the node 2.

During the generation step 702 also a reflection counter is preferably used. The node 1 preferably increases the reflection counter by 1 each time a packet Pk' is received from the node 2 whose packet loss field PLF comprises the measurement value (if the generation counter is unblocked, as it will be described in detail herein below).

The node 2 preferably continuously reflects towards the node 1 the value of the packet loss field PLF comprised in the packets Pk received from the node 1 (step 703). In particular, as the node 2 receives from the node 1 a packet Pk having its packet loss field PLF set to the idle value or the measurement value, it preferably sets the packet loss field PLF of the next packet Pk' to be transmitted to the node 1 equal to the same value as the received packet Pk.

According to an embodiment, step 703 is performed by implementing at the node 2 a counter which is increased by 1 each time a packet Pk with packet loss field PLF equal to the measurement value is received. For each packet Pk' to be transmitted to the node 1, the node 2 preferably checks the counter value. If it is higher than 0, the counter is decreased by 1 and the packet loss field PLF of the packet Pk' is set to the measurement value, otherwise it is set to the idle value and the counter is not changed.

Therefore, while the node 2 is receiving the block B1 of packets Pk generated during the generation step 702 (possibly interleaved with packets Pk with packet loss field PLF equal to the idle value), it preferably transmits back to the node 1 a block B2 of packets Pk' having their packet loss field PLF set to the measurement value. If no packet loss occurs, the block B2 comprises the same number N2=N1 of packets Pk' as the block B1. If a packet loss occurred, instead, the number N2 of packets Pk' in the block B2 is lower than N1.

Upon termination of the generation step 702, the node 1 preferably performs a first pause (step 702*a*). During the first pause 702*a*, the node 1 preferably keeps the value of the packet loss field PLF of the packets Pk to be transmitted equal to the idle value. If packets Pk' with packet loss field PLF equal to the measurement value are received during the first pause 702*a*, the node 1 preferably increases the reflection counter correspondingly.

The first pause 702*a* preferably has a predefined and constant duration $T_G'$. The duration $T_G$ of the generation step 702 and the duration $T_G'$ of the first pause 702*a* are preferably chosen so that $T_G+T_G'$ is longer than the maximum RTT between the nodes 1 and 2, so as to guarantee that at least part of the block B2 has already been received at the node 1 when the subsequent reflection step 704 is started (short of packet loss affecting the packets Pk of the block B1 and/or the packets Pk' of the block B2). The maximum RTT is measured on the link between the nodes 1 and 2 before the round-trip packet loss measurement session is started, e.g. by the Ping technique at one of the nodes. For example, $T_G$ may be set equal to 900 ms and $T_G'$ may be set equal to 100 ms. Considering that the longest RTT on a known communication link is 1 second (satellite link), these values guarantee that the condition $T_G+T_G'>RTT$ is fulfilled for most types of communication links. For other types of link (terrestrial, intercontinental), the above considerations in connection with the embodiment of FIG. 5 still apply.

Then, at the end of the first pause 702*a*, the node 1 preferably starts a reflection step 704, which comprises transmitting a packet Pk with packet loss field PLF comprising the measurement value for each received packet Pk' of the block B2. Hence, at the reflection step 704, the node 1 basically transmits to the node 2 a block B3 of packets Pk having their packet loss field PLF set to the measurement value.

Since the reflection step 704 immediately follows the first pause 702*a*, the time T lapsing between start of the generation step 702 and start of the reflection step 704 is substantially equal to $T_G+T_G'$.

In order to perform the reflection step 704, as described above the node 1 preferably implements a reflection counter which it increases by 1 each time a packet Pk' with packet loss field PLF equal to the measurement value is received. Increase of the reflection counter generally starts during the generation step 702 or the first pause 702*a*, since $T_G+T_G'$ is preferably longer than the RTT between the nodes 1 and 2, and continues during the reflection step 704.

Preferably, when during the first pause 702*a* (if $RTT<T_G'$) or during the reflection step 704 (if $RTT>T_G'$) the node 1 determines that no packet Pk' with packet loss field PLF equal to the measurement value has been received for a time gap of a predefined duration (e.g. $T_G'\pm20\%\ T_G'$), it preferably blocks the reflection counter, namely it prevents the reflection counter from being increased upon reception—after the time gap—of further packets Pk' with packet loss field PLF equal to the measurement value.

During the reflection step 704 and, if the option of reflection counter blocking is adopted, after the reflection counter has been blocked, when the node 1 has to transmit a packet Pk, it preferably checks whether the reflection counter value is higher than 0. In the affirmative, the node 1 preferably sets the packet loss field PLF of the packet Pk to be transmitted equal to the measurement value and decreases the reflection counter by 1. If instead the reflection counter is equal to 0, the node 1 preferably sets the packet loss field PLF of the packet Pk to be transmitted equal to the idle value.

The reflection step 704 may end when a packet Pk with PLF equal to the measurement value has been transmitted for each received packet Pk' of the block B2, namely when the reflection counter reaches the value 0. In this case, the duration $T_R$ of the reflection step 704 is variable and depends on the RTT between the nodes 1 and 2 and on the packet rates in the two directions.

Otherwise, the reflection step 704 may have a predefined and substantially constant duration $T_R$, which may be counted by the local timer of the node 1. In this case, the node 1 terminates the reflection step 704 when it determines that the time $T_R$ has lapsed. If all the packets Pk' of the block B2 have been reflected before lapse of $T_R$, at the end of the reflection step 704 the reflection counter reaches the value 0. Otherwise, the node 1 anyway forces the value of the reflection counter to 0. The predefined duration $T_R$ is preferably set longer than the duration $T_G$ of the generation step 702, so as to minimize the risk that not all the packets Pk' of the block B2 are reflected before lapse of $T_R$.

Further, preferably, the duration $T_R$ of the reflection step 704 and the duration $T_G'$ of the first pause 702*a* are chosen so that $T_R+T_G'$ is longer than the maximum RTT between the nodes 1 and 2. This allows proper operation of the node 1, in that it allows the node 1 to properly determine if all the packets Pk' of the block B2 have been reflected during the reflection step 704. Each packet Pk' of the block B2 is indeed received at the node 1 before the end of the reflection step 704, so that it is counted as a packet to be reflected.

While the node 2 is receiving the block B3 of packets Pk generated during the reflection step 704 (possibly interleaved with packets Pk with packet loss field PLF equal to the idle value), it preferably transmits back to the node 1 a block B4 of packets Pk' having their packet loss field PLF set to the measurement value, as described above (step 703).

In the meanwhile, at the end of the reflection step 704, the node 1 preferably performs a second pause (step 704*a*). During the second pause 704*a*, the node 1 preferably keeps the value of the packet loss field PLF of the packets Pk to be transmitted equal to the idle value. If packets Pk' with packet loss field PLF equal to the measurement value are received during the second pause 704*a*, the node 1 preferably does not increase the reflection counter, if it is still blocked.

The second pause 704*a* preferably has a predefined and constant duration $T_R'$. Preferably, $T_R'$ is chosen so that $T_G+T_G'\leq T_R+T_R'$. According to an embodiment, $T_R'$ is chosen so that $T_G+T_G'=T_R+T_R'$. For example, assuming that the maximum RTT of a known link is 1 second (satellite link), the following values may be used: $T_G$=800 ms, $T_G'$=200 ms, $T_R$=850 ms and $T_R'$=150 ms.

Then, at the end of the first pause 702*a*, the node 1 preferably determines if all the packets Pk' of the block B2 have been reflected during the reflection step 704, namely if a packet Pk with PLF equal to the measurement value has been transmitted for each received packet Pk' of the block B2 (step 705).

In the affirmative the node 1 preferably reverts to the generation step 702, until the end of the measurement session (step 707).

According to the second embodiment, when during the second pause 704*a* (if $RTT<T_R'$) or during the generation step 702 of the subsequent iteration (if $RTT>T_R'$) the node 1 determines that no packet Pk' with packet loss field PLF equal to the measurement value has been received for a time gap of a predefined duration (e.g. $T_R'\pm20\%\ T_R'$), it preferably unblocks the reflection counter, namely it allows again the reflection counter being increased upon reception—after the time gap—of further packets Pk' with packet loss field PLF equal to the measurement value.

If instead the determination of step 705 provides a negative outcome, the node 1 preferably skips an iteration of the algorithm of FIG. 7 (step 706). Step 706 may be performed by means of a variable ComplRifl, which then is checked at the next generation step 702 for deciding whether the generation counter shall be kept to 0 or not, as described above in connection with the embodiment of FIG. 5. Hence, a detailed description will not be repeated.

Skipping an algorithm iteration is one exemplary technique for informing the measurement point 10 of the measurement invalidity at an iteration of the algorithm. According to other embodiments, the node 1 may use other techniques for this purpose, as described above.

Figure 8:
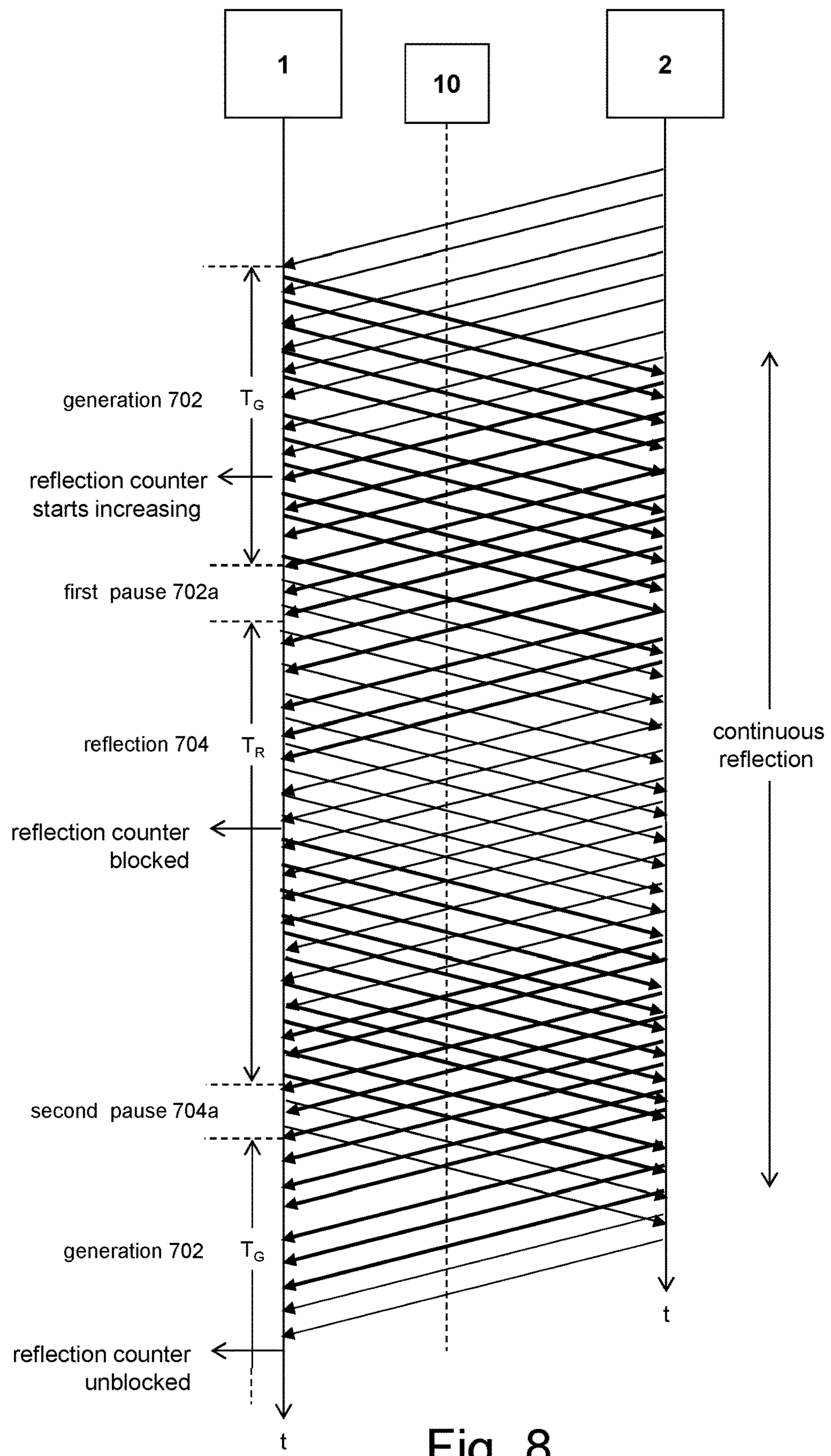
FIG. 8 schematically shows packets exchanged by the first and second node operating according to the flow chart of FIG. 7.

FIG. 8 shows an exemplary exchange of packets between two nodes 1 and 2 operating according to the flow chart of FIG. 7, under the assumption that the packet rate in the direction from node 2 to node 1 is substantially the same as the packet rate in the opposite direction. In FIG. 8, packets Pk and Pk' whose packet loss field PLF is equal to the measurement value are represented by thick lines.

In FIG. 8 it may be seen that during a first iteration of the generation step 702 a block B1 of N1=11 packets Pk with packet loss field PLF equal to the measurement value is generated, each packet Pk of the block B1 being transmitted in response to reception of a respective packet Pk' from the node 2 whose packet loss field PLF is equal to the idle value. Since the packet rates in the two opposite direction are substantially the same, the packets Pk of the block B1 are not interleaved in the example with any packet Pk with packet loss field PLF equal to the idle value, although in general interleaving may occur.

If no packet loss occurs, the node 2 reflects back a block B2 of N2=11 packets Pk' with packet loss field PLF equal to the generation measurement value B. Also the packets Pk' of the block B2 are not interleaved in the example with any packet Pk' with packet loss field PLF equal to the idle value.

As the node 1 determines that a time $T_G$ has lapsed, it ends the generation step 704 and enters the first pause 702*a*. It may be appreciated that, since the duration $T_G$ is longer than the RTT, the packets Pk' of the block B2 start being received at the node 1 while the generation step 702 is still ongoing. The node 1 starts increasing the reflection counter accordingly during the generation step 702.

The node 1 then enters the reflection step 704. During the first pause 702*a* and the reflection step 704, the node 1 continues receiving packets Pk' of the block B2 and increasing the reflection counter accordingly. As the node 1 determines that no packet Pk' with packet loss field PLF equal to the measurement value is received for a time gap of e.g. $T_G'\pm20\%\ T_G'$, it preferably blocks the reflection counter. Then, the node 1 preferably transmits back to the node 2 a block B3 of packets Pk with packet loss field PLF equal to the measurement value. In FIG. 8 it is assumed that the reflection step 704 has a predefined duration $T_R$ long enough to allow the node 1 completing reflection of the whole block B2 of packets Pk'. Then, if no packet loss occurs, the block B3 comprises N3=11 packets Pk with packet loss field PLF equal to the measurement value.

Then, if no packet loss occurs, the node 2 reflects back a block B4 of N4=11 packets Pk' with packet loss field PLF equal to the measurement value to the node 1.

After the end of the reflection step the node 1 enters the second pause 704*a*. It shall be noticed that, even if packets Pk' with packet loss field PLF equal to the measurement value (namely, packet Pk' of the block B4) are received before the end of the reflection step 704 and during the second pause 704*a*, the node 1 does not increase accordingly the reflection counter as long as it is blocked.

Then, the node 1 performs another generation step 702, by generating a new block B1 of packets Pk with packet loss field PLF equal to the measurement value. And so on. The node 1 also unblocks the reflection counter either during the second pause 704*a* or the next generation step 702, as it determines that no packet Pk' with packet loss field PLF equal to the measurement value is received for a time gap of e.g. $T_R'\pm20\%\ T_R'$.

The measurement point 10 may then perform a round-trip packet loss measurement by counting the number N1 of packets Pk of the block B1, the number N3 of packets Pk of the block B3 and then calculating a round-trip packet loss as the difference between N1 and N3. In the opposite direction, the measurement point 10 may perform a round-trip packet loss measurement by counting the number N2 of packets Pk' of the block B2, the number N4 of packets Pk' of the block B4 and then calculating a round-trip packet loss as the difference between N2 and N4.

More specifically, the measurement point 10 may implement a counter counting the number of packets Pk having their packet loss field PLF equal to the measurement value. Hence, the measurement point 10 preferably increases the counter each time it detects a packet Pk with packet loss field PLF equal to the measurement value.

Preferably, when the measurement point 10 detects a first pause of duration substantially equal to $T_G'$ between detection of two consecutive packets Pk having their packet loss field PLF equal to the measurement value, it preferably sets a first variable C1 equal to the difference between the current counter value and the counter value at the end of the preceding pause of duration $T_R'$ (or 0 if there is no preceding pause, namely at the first iteration). At the end of the pause, the measurement point 10 continues increasing the counter.

Then, upon detection of the next pause of duration substantially equal to $T_R'$, it preferably sets a second variable C2 equal to the difference between the current counter value and the counter value at the end of the preceding pause of duration $T_G'$.

Then, the measurement point 10 preferably calculates the round-trip packet loss as the difference between C1 and C2.

By alternately setting the values of C1 and C2 during the whole measurement session, the measurement point 10 basically provides a periodic monitoring of the round-trip packet loss between the nodes 1 and 2.

It may be appreciated that, since at the generation step 702 the node 1 transmits a packet Pk of the block B1 only upon reception of a packet Pk from the node 2, the number of packets Pk of the block B1 is such that the continuous reflection 703 and reflection step 704 can be managed by the node 2 in a reasonable time, even when the packet rate from the node 2 is much lower than the packet rate from the node 1. This allows avoiding congestions at the node 2 and providing measurement periods equal to about 4 RTT, namely of the order of magnitude of 100-200 milliseconds. It shall be noticed that the round-trip packet loss measurement is performed on about ¼ of the packets transmitted in the direction (from node 1 to node 2 or vice versa) having the lower packet rate.

Furthermore, the pauses 702*a*, 704*a* advantageously guarantee that the measurement point 10 is capable of properly distinguishing packets Pk or Pk' transmitted in the same direction and belonging to different blocks B1, B3 or B2, B4. Hence, the measurement point 10 is capable of counting in the proper way the number of packets N1, N3 belonging to the two blocks and, hence, providing a correct value of the round-trip packet loss.

Further, since the time $T=T_G+T_G'$ lapsing between start of the generation step 702 and start of the reflection step 704 is predefined, it may be set to a value unrelated from the actual RTT of the packets in the blocks B1, B2, B3 and B4 between the nodes 1 and 2. As discussed above, this advantageously makes the round-trip packet loss measurement totally decoupled from the RTT between the nodes 1 and 2.

Moreover, since the time $T=T_G+T_G'$ lapsing between start of the generation step 702 and start of the reflection step 704 is predefined and substantially constant, the implementation of the count of the numbers of packets Pk forming the blocks B1 and B3 (or B2 and B4) at the measurement point 10 is advantageously periodic with a fixed period, and then it is simpler to implement than in case e.g. of a transmission gap of variable duration.

Also according to this embodiment, the node 1 may use only a percentage of the time $T_G$ for transmitting the block B1. Optionally, such percentage may be dynamically adjusted, as described above in connection with the embodiment of FIG. 5.

The measurement point 10 provides round-trip packet loss measurements with a certain measurement throughput, wherein the expression "measurement throughput" indicates the percentage of measurement packets Pk (or Pk', if the packet rate from the node 2 to the node 1 is lower than the packet rate in the opposite direction), namely of the packets Pk or Pk' which are used for calculating the round-trip packet loss. The measurement packets are those whose packet loss field PLF is set equal to a measurement value during the generation step 502, 702 in a single iteration of the algorithm in FIG. 5 or 7.

Hence, an approximated formula providing the measurement throughput may be $T_G/(T_G+T_G'+T_R+T_R')$, where $T_G'=T_R'=0$ for the embodiment of FIG. 5. If only a percentage of the time $T_G$ is used by the node 1 for transmitting the block B1, then the throughput calculated according to the above formula shall be multiplied by the same percentage. For example, if $T_G$=900 ms, $T_G'$=100 ms, $T_R$=900 ms and $T_R'$=100 ms, the above formula provides a measurement throughput of 900 ms/2000 ms=45%. If only 90% of the time $T_G$ is used by the node 1 for transmitting the block B1, then the measurement throughput is 90% (900 ms/2000 ms)=40.5%.

In addition to the above described round-trip packet loss measurements, if two measurement points may be provided between the nodes 1 and 2, also one-way measurements may be advantageously performed.

In particular, if two idle values A and C and two measurement values B and D are used (see algorithm of FIG. 5), one-way packet loss measurements e.g. according to WO 2010/072251 in the name of the same Applicant may be advantageously performed on the whole traffic transmitted in a direction (e.g. from node 1 to node 2 or vice versa), namely both on packets Pk with packet loss field PLF equal to the measurement value B or D and on packets Pk with packet loss field PLF equal to the idle value A or C. Also average one-way delay measurement e.g. according to WO 2013/174417 in the name of the same Applicant may also be made on the whole traffic.

Also sample one-way delay measurements may be performed, for example according to WO 2011/079857 in the name of the same Applicant. For each measurement period, for example, the sample packet Pk may be made distinguishable from the other packets Pk of the same period e.g. by switching the value of one of the bits of the measurement value comprised in their packet loss field PLF. The measurement point 10 shall of course properly consider this anomalous measurement value of the packet loss field PLF when the packets Pk of the blocks B1 and B2 are identified. Alternatively, a sampling signature may be used to identify the sample packets, according e.g. WO 2017/071779 or WO 2018/072828 in the name of the same Applicant. This is advantageous because it does not require any modification of the measurement value in the packet loss field PLF.

If instead a single idle value and a single measurement value are used (see algorithm of FIG. 7), one-way packet loss measurement and average one-way delay measurement may be performed only on the packets Pk whose packet loss field PLF is equal to the measurement value.

Sample one-way delay measurements may also be performed, e.g. using a sampling signature to identify the sample packets, according WO 2017/071779 or WO 2018/072828 in the name of the same Applicant.

In the embodiments described above, the node 1 performs a single reflection step 304, 504, 704 after each generation step 302, 502, 702. This is however not limiting. According to other embodiments, the node 1 may interleave generation and reflection, so as to increase the number of round-trip packet loss measurements.

For example, the packet loss field PLF may be a two-bit field, and an algorithm similar to that of FIG. 7 may be applied independently to each single bit of PLF. Preferably, the generation step 702 and reflection step 704 applied to the first bit of PLF are interleaved with the generation step 702 and reflection step 704 applied to the second bit of PLF. In other words, while the node 1 performs the generation step 702 on the first bit, it also performs the reflection step 704 on the second bit and vice versa. The measurement point 10 alternatively detects packets Pk (or Pk') based on the first bit and second bit of the packet loss field PLF.

This way, two separate, interleaved round-trip packet loss measurements may be performed by the measurement point 10, each one being regulated by a respective bit of the packet loss field PLF. If packets Pk with PLF equal to "10" are generated during odd periods and packets Pk with PLF equal to "01" are generated during even period, substantially in the middle of each odd period (starting from the third one) the measurement point 10 preferably calculates the round-trip packet loss as the difference between the number of packets Pk with PLF equal to "10" in the preceding odd period and the number of packets Pk with PLF equal to "10" during the current odd period. Similarly, substantially in the middle of each even period (starting from the fourth one) the measurement point 10 preferably calculates the round-trip packet loss as the difference between the number of packets Pk with PLF equal to "01" in the preceding even period and the number of packets Pk with PLF equal to "01" during the current even period.

If the packet loss field PLF has four bits, the operation of the node 1 is substantially the same, without the first and second pauses.

In any case, the number of round-trip packet loss measurements is advantageously increased.

According the above description of the reflection step 504, 704, the node 1 reflects the received block B2 of packets Pk' by transmitting a block B3 of packets Pk back to the node 2 at its maximum packet rate, independently of the packet rate from the node 2 to the node 1. According to a variant, the node 1 may adapt its reflection rate at steps 504, 704 to the packet rate from the node 2. Hence, during the reflection step 504, 704 the node 1 preferably transmits a packet Pk with packet loss field PLF equal to a measurement value only upon reception of a packet Pk' from the node 2, independently of the value of its packet loss field PLF.

The invention claimed is:

1. A method for enabling a round-trip packet loss measurement in a packet-switched communication network, said method comprising exchanging between a first node and a second node of said communication network packets comprising a packet loss field, wherein said packet loss field is settable to either at least one idle value or at least one measurement value, said exchanging comprising:

a) by said first node performing a generation step comprising transmitting to said second node first packets having said packet loss field set to said at least one measurement value;

b) by said second node, for each one of the first packets having the packet loss field set to said at least one measurement value and received from said first node, transmitting to said first node a respective second packet having said packet loss field set to said at least one measurement value; and c) by said first node, performing a reflection step comprising, for each one of the second packets having the packet loss field set to said at least one measurement value and received from said second node, transmitting to said second node a respective third packet having said packet loss field set to said at least one measurement value, wherein a time lapsing between start of said generation step and start of said reflection step has a predefined duration, and the at least one idle value and the at least one measurement value are predefined.

2. The method according to claim 1, wherein said time is set to a value higher than a previously measured maximum round-trip time on the link between said first node and said second node.

3. The method according to claim 1, wherein said generation step has a predefined duration.

4. The method according to claim 3, wherein said generation step comprises using only a percentage of said duration for transmitting to said second node first packets having said packet loss field set to said at least one measurement value.

5. The method according to claim 4, wherein said step a) further comprises dynamically adjusting said percentage of said duration used for transmitting to said second node first packets having said packet loss field set to said at least one measurement value.

6. The method according to claim 1, wherein said reflection step has a predefined duration, said reflection step being terminated upon expiry of said duration irrespective of whether a respective third packet with said packet loss field set to said at least one measurement value has been transmitted for each one of said second packets received from said second node.

7. The method according to claim 6 wherein it further comprises, at said first node, checking whether a respective third packet with said packet loss field set to said at least one measurement value has been transmitted for each one of said second packets received from said second node and, when said respective third packet with said packet loss field set to said at least one measurement value has not been transmitted for each one of said second packets received from said second node, introducing an anomaly in the transmission of said first packets and/or third packets indicating that the packet loss round-trip measurement is not valid.

8. The method according to claim 1, wherein said reflection step is terminated when it is determined that a respective third packet with said packet loss field set to said at least one measurement value has been transmitted for each one of said second packets received from said second node.

9. The method according to claim 1, wherein said packet loss field is settable to any of at least one idle value and two alternative measurement values comprising a generation measurement value and a reflection measurement value, wherein:

said generation step comprises transmitting to said second node first packets having said packet loss field set to said generation measurement value; and said reflection step comprises, upon reception from said second node of each one of the second packets, transmitting to said second node a respective third packet having said packet loss field set to said reflection measurement value, said reflection step being started upon termination of said generation step with no pause between said generation step and said reflection step.

10. The method according to claim 1, wherein said packet loss field is settable to any of an idle value and a measurement value, wherein said method further comprises, at said first node:

performing a first pause between said generation step and said reflection step, said first pause having a predefined and constant duration; and performing a second pause after said reflection step, said second pause having a predefined duration, wherein said first pause and said second pause comprise keeping the packet loss field of packets to be transmitted equal to said idle value.

11. The method according to claim 10, wherein it further comprises, at said first node:

during said first pause or said reflection step, starting to ignore packets received from said second node having said packet loss field set to said measurement value after no packet having said packet loss field equal to said measurement value has been received for a time gap having a predefined duration; and during said second pause or a next generation step, stopping to ignore packets received from said second node having said packet loss field set to said measurement value after no packet having said packet loss field equal to said measurement value has been received for a further time gap having a further predefined duration.

12. The method according to claim 1, wherein at said generation step and/or said reflection step, said setting said packet loss field of a packet to be transmitted to said second node equal to said at least one measurement value is in response to reception of a packet from said second node.

13. A method for performing a round-trip packet loss measurement in a packet-switched communication network, said method comprising the steps of the method according to claim 1 and:

d) at a measurement point, counting a number of said first packets and counting a number of said third packets, said round-trip packet loss measurement being based on said number of said first packets and said number of said third packets.

14. The method according to claim 1, wherein the predefined duration is constant.

15. A method for exchanging packets between a first node and a second node of a packet-switched communication network, said packets comprising a packet loss field, wherein said packet loss field is settable to either at least one idle value or at least one measurement value, said method comprising:

a) by said first node performing a generation step comprising transmitting to said second node first packets having said packet loss field set to said at least one measurement value;

b) by said second node, for each one of the first packets having the packet loss field set to said at least one measurement value and received from said first node, transmitting to said first node a respective second packet having said packet loss field set to said at least one measurement value; and c) by said first node, performing a reflection step comprising, for each one of the second packets having the packet loss field set to said at least one measurement value and received from said second node, transmitting to said second node a respective third packet having said packet loss field set to said at least one measurement value, wherein a time lapsing between start of said generation step and start of said reflection step has a predefined duration, and the at least one idle value and the at least one measurement value are predefined.

16. A packet-switched communication network comprising a first node and a second node configured to exchange packets comprising a packet loss field, wherein said packet loss field is settable to either at least one idle value or at least one measurement value, wherein:

a) said first node is configured to perform a generation step comprising transmitting to said second node first packets having said packet loss field set to said at least one measurement value;

b) said second node is configured to, for each one of the first packets having said packet loss field set to said at least one measurement value and received from said first node, transmit to said first node a respective second packet having said packet loss field set to said at least one measurement value; and c) said first node is further configure to perform a reflection step comprising, for each one of the second packets having said packet loss field set to said at least one measurement value and received from said second node, transmitting to said second node a respective third packet having said packet loss field set to said at least one measurement value, wherein a time lapsing between start of said generation step and start of said reflection step has a predefined duration, and the at least one idle value and the at least one measurement value are predefined.

17. The packet-switched communication network of claim 15, further comprising at least one measurement point configured to count a number of said first packets and count a number of said third packets, a round-trip packet loss measurement being based on said number of said first packets and said number of said third packets.

* * * * *